2 Sheets—Sheet 1.
R. W. BAYLEY.
Assignor to the WESTINGHOUSE AIR BRAKE COMPANY.
AIR BRAKE.
No. 11,145. Reissued Feb. 17, 1891.
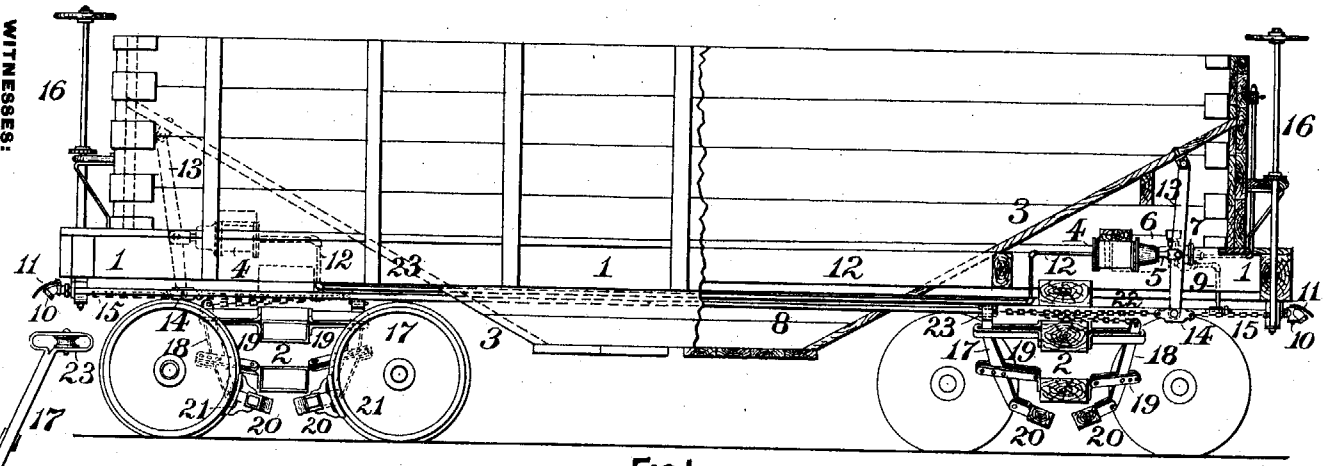
FIG. 1.
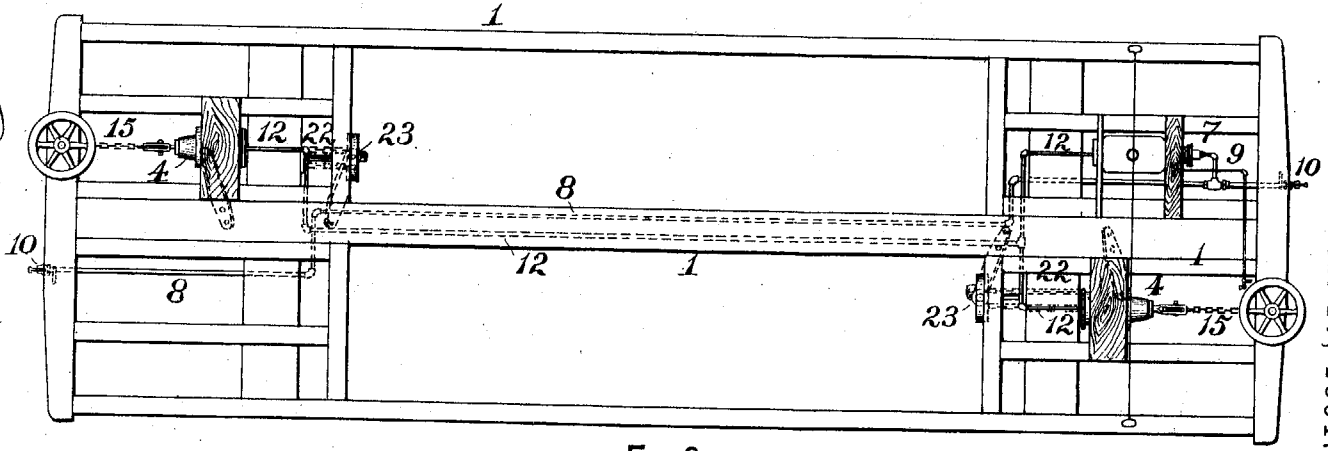
FIG. 2.
FIG. 3.
WITNESSES:
E. Newell.
T. J. Hogan.
INVENTOR,
R. W. Bayley,
by J. Howden Bell
Att'y.
THE NORRIS PETERS CO., PHOTO-LITHO., WASHINGTON, D. C.

R. W. BAYLEY.

Assignor to the WESTINGHOUSE AIR BRAKE COMPANY.

AIR BRAKE.

No. 11,145 Reissued Feb. 17, 1891.

WITNESSES:

E. Newell.

T. J. Hogan.

INVENTOR,

R. W. Bayley, by J. Warden Bell

Att'y.

THE NORRIS PETERS CO., PHOTO-LITHO., WASHINGTON, D. C.

UNITED STATES PATENT OFFICE.

RICHARD W. BAYLEY, OF PITTSBURG, PENNSYLVANIA, ASSIGNOR TO THE WESTINGHOUSE AIR BRAKE COMPANY, OF SAME PLACE.

AIR-BRAKE.

SPECIFICATION forming part of Reissued Letters Patent No. 11,145, dated February 17, 1891.

Original No. 412,695, dated October 8, 1889. Application for reissue filed January 13, 1891. Serial No. 377,677.

*To all whom it may concern:*

Be it known that I, RICHARD W. BAYLEY, a citizen of the United States, residing at Pittsburg, in the county of Allegheny and State of Pennsylvania, have invented or discovered a certain new and useful Improvement in Air-Brake Apparatus for Cars, of which improvement the following is a specification.

The object of my invention is to provide an automatic air-brake apparatus or equipment which will be conveniently and desirably applicable to railroad-cars, the construction of the framing and body of which is such as to render impracticable or inconvenient the mechanism ordinarily heretofore employed.

To this end my invention, generally stated, consists in the combination of a brake-cylinder fixed to a car-body above and adjacent to one of its trucks, a brake-cylinder lever coupled to the car-body above the cylinder, and to the piston of said cylinder, a main air-pipe, an auxiliary reservoir, and a triple valve and draft connections coupling the brake-cylinder lever to a brake-lever of the adjacent truck; also, in the combination of two brake-cylinders, the pistons of which, respectively, actuate the brakes of separate trucks, and a single auxiliary reservoir and triple valve connected with a main air-pipe and with each of said brake-cylinders.

The improvement claimed is hereinafter fully set forth.

Figure 4:
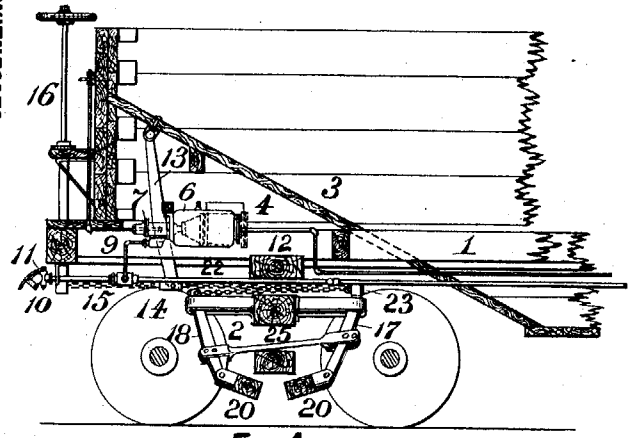
Figure 5:
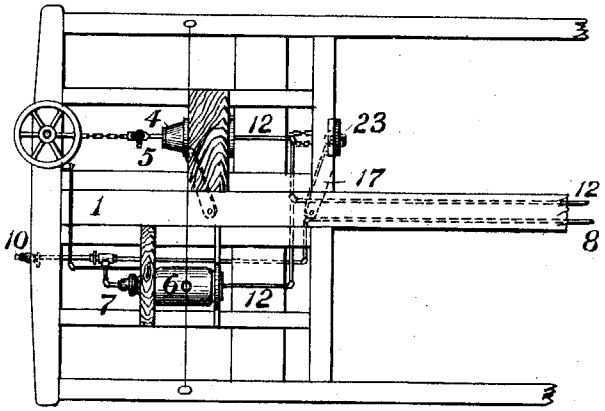

In the accompanying drawings, Figure 1 is a view, partly in elevation and partly in longitudinal central section, of a drop-bottom gondola-car, illustrating an application of my invention; Fig. 2, a plan or top view of the car-frame and brake apparatus; Fig. 3, a view in elevation of one of the brake-levers detached; Fig. 4, a partial longitudinal central section of a similar car; Fig. 5, a partial plan of the frame and brake apparatus, illustrating a modification in the details of the brake-lever connections; and Figs. 6 and 7 similar views illustrating a further modification in the same.

My invention is herein illustrated as applied to a drop-bottom gondola-car—a type which is now extensively in use, and in which, by reason of the downward projection of the hopper-bottom, the ordinary construction of air-brake equipment would be wholly inapplicable, so that hand-brakes only have heretofore been employed upon these and other cars of the same general type.

In the practice of my invention I secure upon the frame 1 of the car, adjacent to each of its ends and between the top of one of the trucks 2 and the inclined end portion of the hopper-bottom 3, a brake-cylinder 4, provided with a piston, to which a piston-rod 5 is connected in the usual manner. Adjacent to one of the brake-cylinders 4 an auxiliary reservoir 6 and triple valve 7 are secured upon the car-frame, air under pressure being supplied to the auxiliary reservoir through the triple valve from a main air or brake pipe 8, which extends longitudinally below the frame and is connected by a pipe 9 with the triple valve, being likewise provided with the ordinary end couplings 10 and valves 11 for connection to the brake-pipes of the adjoining cars of a train and for closing either of its ends, respectively. The triple valve is connected by pipes 12 with each of the brake-cylinders 4, so as to effect the supply or exhaust of air, respectively, to or from both the brake-cylinders simultaneously.

The triple valve and auxiliary reservoir are similar to those heretofore employed, the construction and operation of which, being well known in the art and not forming part of my present invention, need not be herein described.

The pressure by which the application of the brakes is effected is transmitted to the brake-beams and connected brake-shoes of each of the trucks 2 of the car from the piston of the brake-cylinder 4, which is located adjacent thereto through a brake-cylinder lever 13, which is pivoted at its upper end to a part of the car-body, (in this instance the hopper-bottom 3,) and is coupled at its lower end by a link 14 to the chain 15 of the hand-brake staff 16 and to a chain or pull-rod connected to the brake-levers of the trucks, as presently to be described, the piston-rod 5 of the brake-cylinder 4 being coupled to the lever 13 between its upper and lower ends. Under the above construction it will be seen that by the outward movement of the brake-cylinder piston-rods 5, under pressure admitted to the cylinders from the auxiliary reservoir by the triple valve, upon a reduction of pressure in the brake-pipe the brakes are simultaneously set or applied upon both trucks of the car, and are coincidently released by the inward movement of the piston-rods upon the restoration of pressure in the brake-pipe.

Figure 6:
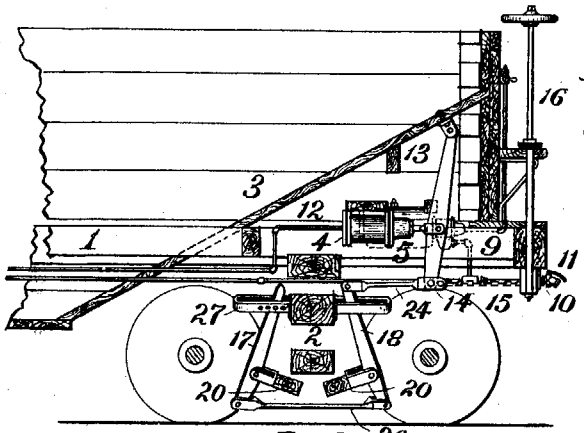
Figure 7:
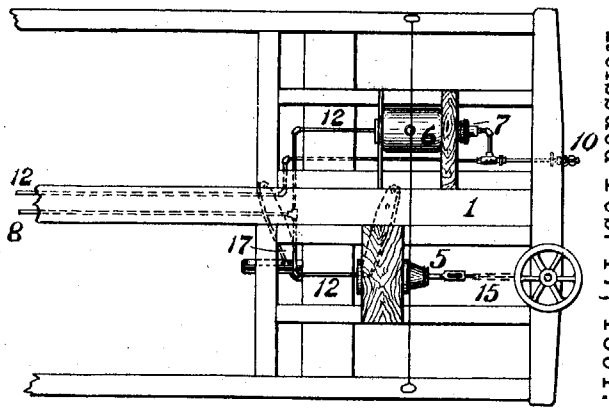

The brake-cylinder levers 13 and links 14 may be connected to the brake-levers 17 and 18, either by means of chains 22 or by pull-rods 24, forming extensions of the link 14, the former connection being exemplified in Figs. 1 to 5 and the latter in Figs. 6 and 7, and modifications in the details of suspension and connection of the brake-levers may also be made, in the discretion of the constructor, without departure from the essential features of my invention.

As illustrated in Figs. 1 and 2, the link 14 of each of the brake-cylinder levers 13 is coupled by a chain 22, passing around a guide-roller or sheave 23, journaled in the upper end of one of the brake-levers 17 of the adjacent truck 2 to the upper end of the opposite brake-lever 18 of said truck. The brake-levers 17 and 18 are pivoted at their lower ends to brake-beams 20, carrying brake-heads provided with proper brake-shoes 21, and are pivoted above their lower ends to bearings 19, fixed upon the framing of the truck, draft upon the chains 22 thus acting to apply the brake-shoes to the wheels. The lengths of the lever-arms of the respective brake-levers should of course be properly proportioned to obtain equal brake-shoe pressure upon the two brake-beams.

In the modification shown in Figs. 4 and 5 the draft of the brake-cylinder levers 13 and chains 22 connected thereto is similarly transmitted to the brake-levers 17 and 18 of each truck; but the brake-levers, instead of being pivoted to bearings on the truck-framing, as in the former instance, are coupled one to the other in each truck between their power and resistance ends by a connecting-link 25, the pivots of which act as their fulcrums, thus constituting, as before, a lever system of the first order.

A further modification of detail is shown in Figs. 6 and 7, the brake-cylinder levers 13 being in this case coupled to the upper ends of the outer or live brake-levers 18 of the trucks by links or pull-rods 24, which form part of the links 14, by which the levers 13 are connected to the hand-brake-staff chains 15, the sheaves 23 being here dispensed with. The upper ends of the inner or dead levers 17 of the trucks are pivoted to guides 27 on the truck-framing, and the live and dead levers are coupled at their lower ends by links 26, forming lever systems of the second order, to which power is directly transmitted from the brake-cylinder le s 13 through the pull-rods 24.

My improvement is applicable, without substantial variation of its structural and operative principles, to railroad-cars of other constructions, in which, as in the instance shown, the form and relation of the car-body and running-gear are such as to preclude the adaptation of existing systems of air-brake mechanism, the minor changes of detail which may be required being within the ordinary skill of a competent constructor and not involving a departure from the essential features of my invention.

I claim as my invention and desire to secure by Letters Patent—

1. The combination of a brake-cylinder fixed to a car-body above and adjacent to one of its trucks, a main air or brake pipe, an auxiliary reservoir and a triple valve connected with the brake-pipe and brake-cylinder, a brake-cylinder lever coupled to the car-body above the brake-cylinder and to the piston-rod of said cylinder, and draft-connections coupling the free end of the brake-cylinder lever to a brake-lever of the adjoining truck, substantially as set forth.

2. The combination of two brake-cylinders, each fixed to a car-body above and adjacent to one of its trucks, a main air or brake pipe, an auxiliary reservoir and triple valve connected with the brake-pipe and with each of the brake-cylinders, two brake-cylinder levers, each coupled to the car-body above one of the brake-cylinders and to the piston-rod of said cylinder, and draft-connections coupling the free ends of the brake-cylinder levers to the brake-levers of the adjoining truck, substantially as set forth.

3. The combination of two brake-cylinders, each fixed to a car-body above and adjacent to one of its trucks, a main air or brake pipe, an auxiliary reservoir and triple valve connected with the brake-pipe and with each of the brake-cylinders, two brake-cylinder levers, each coupled to the car-body above one of the brake-cylinders and to the piston-rod of said cylinder, and chains, each connecting the lower end of one of the brake-cylinder levers to one of the brake-levers of the adjacent truck and passing around a guide on the opposite brake-lever of said truck, substantially as set forth.

In testimony whereof I have hereunto set my hand.

RICHARD W. BAYLEY.

Witnesses:
GEO. L. WEBB,
EDWIN E. LITTLE.